United States Patent [19]

Morozov et al.

[11] Patent Number: 5,705,538

[45] Date of Patent: Jan. 6, 1998

[54] COMPOSITION FOR OBTAINING FOAMED POLYVINYLCHLORIDE MATERIAL AND METHOD OF OBTAINING IT

[75] Inventors: Igor Victorovich Morozov; Lyubov Dmitrievna Strelkova; Yuliya Vladimirovna Razborova; Pyotr Mikhailovich Traskin; German Valeryevich Gordeyev, all of Dzerzhinsk; Valery Innokentyevich Yemelyanov, Sayansk; Valery Iosifovich Kharitonov, Sayansk; Anatoly Fyodorovich Perevalov, Sayansk; Vladimir Yevgenyevich Popov, Sayansk; Vyacheclav Nikolayevich Kovalev, Sayansk, all of Russian Federation

[73] Assignee: Polimerplast, Dzerzhinsk Nizhegrodskoy obl., Russian Federation

[21] Appl. No.: 382,027

[22] PCT Filed: Jul. 26, 1993

[86] PCT No.: PCT/RU93/00177

§ 371 Date: Apr. 3, 1995

§ 102(e) Date: Apr. 3, 1995

[87] PCT Pub. No.: WO94/04602

PCT Pub. Date: Mar. 3, 1994

[30] Foreign Application Priority Data

Aug. 11, 1992 [RU] Russian Federation ............... 5058438

Oct. 20, 1992 [RU] Russian Federation ............ 92001241

[51] Int. Cl.$^6$ ............................................ C08J 9/24

[52] U.S. Cl. .................. 521/89; 264/126; 521/145; 521/919

[58] Field of Search ................ 521/89, 145, 919; 264/126

[56] References Cited

U.S. PATENT DOCUMENTS

| 3,945,955 | 3/1976 | Ihde, Jr. |
| 4,165,415 | 8/1979 | Adachi et al. |
| 4,218,553 | 8/1980 | Winter et al. ...................... 521/72 |

FOREIGN PATENT DOCUMENTS 1465912  3/1977  United Kingdom.

*Primary Examiner*—Morton Foelak
*Attorney, Agent, or Firm*—Rader, Fishman and Grauer PLLC

[57] ABSTRACT

A foamed polyvinylchloride (PVC) material is produced by mixing of 100 mass parts of PVC with 0.5–5 mass parts of sodium alkyl sulfonate, molding of the obtained composition and followed by heating for foaming at 190°–300° C. for 3–20 mins. Molding is performed either under 0.5–400 MPa and 20°–170° C., followed by heating to 140°–150° C. in the closed space, or in a free state in the form of 2–16 mm thickness layer. In the latter case the layer before foaming can be subjected to packing.

4 Claims, No Drawings

5,705,538

COMPOSITION FOR OBTAINING FOAMED POLYVINYLCHLORIDE MATERIAL AND METHOD OF OBTAINING IT

FIELD OF THE INVENTION

The invention relates to the compositions for producing foamed polyvinylchloride (PVC) materials and to the methods of their production.

It is known, that foamed PVC materials with improved physical and mechanical properties, e.g. high elasticity and thermostability, very often are multicomponent systems, including a number of specially aimed additives: foaming, stabilizing and cross-linking agents, fillers, lubricants, etc.

There is known a six-component composition for producing foamed PVC material (U.S. Pat. No. 4,434,251, C 08 J 9/10, published in 1984), consisting of PVC, plasticizer (dioctylphthalate), stabilizing agent (tribasic and dibasic lead stearate), bubble nucleation agent (calcium carbonate), cross-linking agent (triallyl isocyanurate), foaming agent (azodicarbonamide).

From this reference there is known the method of foamed material production, comprising mixing of PVC, dioctylphthalate, lead stearate, calcium carbonate, triallyl isocyanurate and azodicarbonamide on the rollers, molding the mixture at 150° C. to obtain 1 mm thickness sheet material, its radiation by an electrons effluent of 6 to 10 Mrad and the following heating on wire screen at 220° C. The material produced according to this method has the apparent density of 0.10–0.12 g/cu.cm, and the gel content is 28–35%.

There is known a six-component composition for producing foamed PVC material (Japanese Pat. Applic. No. 58-1729, C 08 J 9/06, published in 1983), consisting of PVC, plasticizer (esters of phthalic or phosphoric acid), stabilizing agent (organotin derivatives), cross-linking agent (trimethylol propane triacrylate, triallyl isocyanurate), foaming agent (azodicarbonamide), filler (chalk, magnesium oxide, talc).

From this reference there is known the method of foamed material production, comprising mixing of PVC, plasticizer, stabilizing agent, cross-linking agent, foaming agent and filler on the rollers at 140°–165° C., molding the mixture at 150° C. to obtain 1 mm thickness sheet material, its radiation by an electrons effluent of 8 to 10 Mrad and the following heating on wire screen by hot air at 220° C. The material produced according to this method has the apparent density of less than 0.3 g/cu.cm, and the gel content is 20–60%.

The proximate to the composition suggested, according to the technical concept, is the known two-component composition for producing foamed PVC material, this composition consists of 100 mass parts of emulsion PVC and 5–30 mass parts of polar organic liquid, in particular, the mixture of dimethyl formamide with ethylene glycol (GB Patent No. 1549949, C3C, established in 1979).

From this reference there is known the method, which is proximate to the method of the present invention according to the technical concept. This known method presents the process of foamed PVC material production comprising mixing of the powder emulsion PVC with addition of a polar liquid (the mixture of dimethyl formamide and ethylene glycol) in amount of 5–30 mass parts per 100 mass parts of PVC, molding under pressure of 1–25 MPa and heating in a high-frequency field at the rate of 190° C./min. for 40 s. The obtained material has the apparent density of 0.9–1.0 g/cu.cm, the compressive strength of 8–13 MPa (without indication, what deformation limits these values are related to). Reproduction of this method showed, that the material is characterized by absence of insoluble fraction, at 50% compression deformation the material is destroyed; the material destruction rate under vacuum at 175° C., which characterizes its thermostability, is $1.25 \cdot 10^{-6}$ mg HCl/g PVC.s.

DESCRIPTION OF THE INVENTION

An object of this invention is to provide the foamed PVC material with improved strength and thermostability, produced on the simple composition base.

To achieve this object there is suggested the composition for producing the foamed polyvinylchloride material, consisting of polyvinylchloride and a polar compound additive, which contains suspension or mass polyvinylchloride, as a polyvinylchloride, and sodium alkyl sulfonate, as an additive, in the following component ratio, mass parts:

| polyvinylchloride | 100 |
|---|---|
| sodium alkyl sulfonate | 0.5–5. |

This object is also achieved by simultaneous suggestion of the method for the foamed polyvinylchloride material production, which comprises mixing of powder polyvinylchloride with a polar compound additive, molding of the mixture and the following heating, characterized in that suspension or mass polyvinylchloride is mixed with sodium alkyl sulfonate, taken in amount of 0.5–5 mass parts per 100 mass parts of polyvinylchloride, then it is molded and heated in a free state at 190°–300° C. for 3–15 mins.

Production of the two-component composition and its treatment according to the suggested method allow to obtain PVC materials with improved strength and thermostability: the obtained material has a cellular porous structure, characterized by 0.20–1.0 g/cu.cm apparent density, 5–85% cross-linking extent, absence of breaking stress at compression, the relation of compression stress by 50% compression deformation to apparent density being 13.5–52.0 MPa.cu.cm/g and the destruction rate under vacuum at 175° C. being 0.20–0.80 mg HCl/g PVC.s. From the prior art there are unknown cross-linked foamed PVC materials of cellular structure, obtained on the two-component composition base.

The sodium alkyl sulfonate use in amount of less than 0.5 mass parts per 100 mass parts of PVC does not provide formation of a cross-linking structure and, consequently, obtaining of a stable material. Addition to the composition of more than 5 mass parts of sodium alkyl sulfonate per 100 mass parts of PVC worsens foaming of PVC and leads to formation of a high apparent density material.

DESCRIPTION OF THE ALTERNATIVE EMBODIMENTS OF THE INVENTION

Depending on what kind of articles are to be manufactured of the proposed composition according to the suggested method, the alternative embodiments of the composition molding are possible.

If the material is intended for production of piece articles of a predetermined shape, it is advisable to carry out molding of the composition under the pressure of 0.5–400 MPa and the temperature of 20°–170° C. to achieve 0.72–1.28 g/cu.cm density, followed by heating in the closed space to 140°–150° C., then the molded composition is subjected to heating for foaming.

Realization of this alternative embodiment of molding under the pressure of above 400 MPa or at the temperature of below 20° C. does not affect the material properties, but requires substantial power consumption. Under the molding pressure of below 0.5 MPa or at the molding temperature of above 170° C., either without heating in the closed space there is no formation of the material suitable for application. Molding of the powder PVC to achieve density of below 0.72 g/cu.cm or above 1.28 g/cu.cm, either do, not allow to obtain an integral material, or leads to obtaining the material, having high apparent density and low cross-linking extent.

Heating of the molded composition for foaming proceeds at 190°–300° C. for 3–15 mins., and, as a rule, the increase of heating temperature reduces its required duration. At lesser values of heating temperature and time a noncrosslinked material of high apparent density is formed. The process realization at the heating temperature and time, which are above the claimed ones, does not lead to formation of porous material useful for application.

To obtain the textured surface articles or long-size articles another alternative embodiment is preferred, in which the composition is molded in a free state in the form of 2–16 mm thickness layer, then the molded composition is subjected to heating for foaming.

Molding of the layer of thickness of less than 2 mm leads to formation of the material of high apparent density, as for the layer of thickness of more than 16 mm it does not allow to produce material suitable for application.

The mixture layer after molding can be subjected to packing, e.g. by squeegeing with a smooth roller, or by any other known method. It allows, at other parameters being equal, to obtain more light material (in the above mentioned ranges of apparent density).

The molded composition heating for foaming according to this alternative embodiment proceeds at 220°–300° C. for 3–20 mins. In this case, as well as in the first embodiment, an inverse ratio of heating temperature to time takes place; the results of heating procedure at the temperature and the pressure dropped out from the claimed limits are analogous to that of the first embodiment.

Preference of one of the embodiments for producing certain articles does not mean, that these articles cannot be produced according to other embodiment: and article can be obtained according to any alternative embodiment.

The material properties, required for a definite user, in the above mentioned ranges are achieved due to the selection of an embodiment and its production parameters in the claimed ranges.

For better understanding of the present invention there are given illustrative examples of its realization.

EXAMPLE 1

0.5 mass parts of sodium alkyl sulfonate are added to 100 mass parts of suspension PVC (GOST 14332-78), the composition is being mixed and molded at 150 MPa and the temperature of 20° C. to achieve blank density ($r_p$) of 1.25 g/cu.cm, then it is heated in the closed space to the temperature ($T_{hc}$) of 140° C., then it is heated in a free state at the temperature ($T_{ho}$) of 250° C. for 7 mins. ($t_{ho}$).

By method of hydrostatic weighing an apparent density of the foamed material ($r_m$) is determined. An insoluble fraction amount ($P_{if}$) is determined by way of solving in tetrahydrofuran for 24 hrs. at 30° C. The compression stress at 50% deformation is determined (GOST 23206-78) and the ratio of this index to the material apparent density $P_c/r_m$ is calculated. To determine the compression strength appeared to be impossible because during the compression test according to a standard method the material is strained without breaking. The thermodestruction rate ($V_{HCl}$) is determined as the amount of HCl, evolved at 175° C. under vacuum, per unit of PVC mass in a unit of time.

Table 1 illustrates the composition formulation, working conditions and the material properties according to this and the following examples.

EXAMPLES 2–11

The process is performed according to the procedure of Example 1, the composition formulation and the method conditions being changed. Thus, in Examples 2–3 and 5–11 a suspension PVC is used, in example 4 a mass PVC (TU 6-01-678-86) is used.

EXAMPLE 12

(comparative, according to the GB Patent No. 1549949).

100 mass parts of emulsion PVC, 10 mass parts of dimethyl formamide, 10 mass parts of ethylene glycol are mixed for 0.5 hr in a mixer, the composition is molded under the pressure of 1.5 MPa for 3 mins. into pellets with diameter of 100 mm and thickness of 30 mm. The thermal treatment is carried out in a high-frequency field for 40 s. at a rate of 190° C./min., and the properties are determined.

EXAMPLE 13

100 mass parts of powder suspension PVC (GOST 14332-78) are mixed with 0.5 mass parts of sodium alkyl sulfonate, filled to form layer of 6 mm thickness and heated at the temperature in the oven of 250° C. for 12 mins. The foamed PVC material is obtained, and its properties are determined according to Example 1.

Table 2 illustrates the composition formulation, working conditions and the material properties according to this and the following examples.

EXAMPLES 14–27

The process is performed according to the procedure of Example 13, the composition formulation and the method conditions being changed, thus, in Examples 14–20 a suspension PVC (GOST 14332-78) is used, in Example 21–27 a mass PVC (TU 6-01-678-86) is used.

EXAMPLE 28

The process is performed according to the procedure of Example 14, the composition layer is being molded on a metal band by a smooth roller.

EXAMPLE 29

The process is performed according to the procedure of Example 22, the composition layer is being molded on a metal band by a smooth roller.

COMMERCIAL APPLICABILITY

The compositions according to the invention may be produced on commercial scale and processed according to the method of the present invention into the foamed materials, which can be used as heat shielding, and vibration-, sound- and acoustic-proofing materials, applied in automotive industry, ship-building industry, aircraft industry etc., as well as in production of various household articles.

polyvinylchloride, is molded and is heated in a free state at 190°–300° C. for 3–20 mins.

TABLE 1

Foamed PVC material production conditions and properties

| No. of ex. 1 | Amount of sodium alkyl sulfonate, mass parts per 100 mass parts of PVC 2 | Molding conditions | | | Heating conditions | | | Properties of the material | | | |
|---|---|---|---|---|---|---|---|---|---|---|---|
| | | Pressure MPa 3 | Temperature °C. 4 | $r_p$ g/cu.cm 5 | $T_{hc}$ °C. 6 | $T_{ho}$ °C. 7 | $t_{ho}$ min 8 | $r_m$ g/cu.cm 9 | $P_y$ % 10 | $P_c/r_m$ MPa.cu.cm/g 11 | $V_{HCl}$ $\frac{mg\ HCl \cdot 10^6}{g\ PVC \cdot s}$ 12 |
| 1. | 0.5 | 150 | 20 | 1.25 | 140 | 250 | 7 | 0.38 | 31 | 14.3 | 0.50 |
| 2. | 2.5 | 150 | 20 | 1.25 | 140 | 250 | 7 | 0.39 | 48 | 15.2 | 0.50 |
| 3. | 5 | 150 | 20 | 1.25 | 140 | 250 | 7 | 0.40 | 71 | 18.0 | 0.50 |
| 4. | 2.5 | 150 | 20 | 1.28 | 140 | 250 | 8 | 0.20 | 54 | 13.5 | 0.70 |
| 5. | 5 | 0.5 | 80 | 0.72 | 140 | 240 | 7 | 0.53 | 36 | 23.8 | 0.40 |
| 6. | 5 | 400 | 20 | 1.25 | 140 | 250 | 7.5 | 0.30 | 80 | 13.8 | 0.50 |
| 7. | 5 | 0.5 | 170 | 1.21 | 140 | 250 | 6 | 0.41 | 41 | 22.3 | 0.40 |
| 8. | 5 | 150 | 20 | 1.25 | 150 | 250 | 6 | 0.35 | 48 | 20.4 | 0.50 |
| 9. | 5 | 50 | 100 | 1.25 | 140 | 190 | 15 | 0.62 | 26 | 47.1 | 0.45 |
| 0. | 5 | 50 | 90 | 1.23 | 140 | 300 | 3 | 0.38 | 37 | 13.9 | 0.50 |
| 1. | 5 | 2 | 80 | 1.20 | 145 | 200 | 7 | 1.00 | 20 | 52.0 | 0.20 |
| 2. (compar.) | — | 1.5 | 20 | 0.98 | — | 135 | 0.7 | 0.9–1.0 | 0 | destroyed | 1.25 |

TABLE 2

Foamed PVC material production conditions and properties

| Amount of sodium alkyl sulfonate, mass parts per 100 mass parts of PVC | Thickness of layer, mm | Heating conditions | | Properties of the material | | | |
|---|---|---|---|---|---|---|---|
| | | $T_h$ °C. | $t_h$ min. | $r_m$ g/cu.cm | $P_y$ % | $P_c/r_m$ MPa.cu.cm/g | $V_{HCl}$ $\frac{mg\ HCl \cdot 10^6}{g\ PVC \cdot s}$ |
| 0.5 | 6 | 250 | 12 | 0.30 | 48 | 13.2 | 0.50 |
| 1.5 | 4 | 250 | 11 | 0.36 | 42 | 16.2 | 0.50 |
| 5 | 4 | 250 | 15 | 0.24 | 85 | 13.4 | 0.55 |
| 1.5 | 2 | 250 | 4 | 0.49 | 18 | 14.8 | 0.40 |
| 1.5 | 8 | 250 | 16 | 0.20 | 84 | 13.5 | 0.80 |
| 1.5 | 16 | 250 | 18 | 0.28 | 70 | 13.9 | 0.50 |
| 1.5 | 2 | 220 | 20 | 0.97 | 5 | 31.0 | 0.20 |
| 0.5 | 2 | 300 | 3 | 1.00 | 5 | 32.0 | 0.20 |
| 0.5 | 7 | 250 | 13 | 0.31 | 48 | 14.6 | 0.50 |
| 1.5 | 5 | 250 | 12 | 0.35 | 42 | 17.1 | 0.50 |
| 5 | 5 | 250 | 10 | 0.75 | 13 | 24.3 | 0.20 |
| 1.5 | 2 | 250 | 5 | 0.50 | 18 | 18.7 | 0.40 |
| 1.5 | 16 | 250 | 17 | 0.22 | 76 | 13.5 | 0.75 |
| 1.5 | 2 | 220 | 20 | 0.96 | 5 | 29.4 | 0.20 |
| 1.5 | 3 | 300 | 3 | 1.00 | 5 | 31.6 | 0.20 |
| 1.5 | 4 | 250 | 11 | 0.25 | 78 | 16.2 | 0.70 |
| 1.5 | 5 | 250 | 12 | 0.24 | 77 | 17.2 | 0.70 |

We claim:

1. A process for the foamed polyvinylchloride production, which comprises mixing of powder polyvinylchloride with a polar compound additive, molding of the mixture and the following heating, characterized in that suspension or mass polyvinylchloride is mixed with sodium alkyl sulfonate, taken in amount of 0.5–5 mass parts per 100 mass parts of polyvinylchloride, is molded and is heated in a free state at 190°–300° C. for 3–20 mins.

2. A process as claimed in claim 1, characterized in that the composition is molded under the pressure of 0.5–400 MPa and the temperature of 20°–170° C. to achieve density of 0.72–1.28 g/cu.cm, and before heating in a free state it is heated in the closed space to 140°–150° C.

3. A process as claimed in claim 1, characterized in that the composition is molded in a free state in the form of 2–16 mm thickness layer.

4. A process as claimed in claim 3, characterized in that the layer of the mixture after its formation is being packed.

* * * * *

UNITED STATES PATENT AND TRADEMARK OFFICE
CERTIFICATE OF CORRECTION

PATENT NO. : 5,705,538
DATED : Jan. 6, 1998
INVENTOR(S) : Morozov et al.

It is certified that error appears in the above-identified patent and that said Letters Patent is hereby corrected as shown below:

Vladimir Izrailevich Zegelman, deceased, late of Russian Federation, by Yuliya Vladimirovna Razborova, legal representative.

Column 1, line 56, delete "established" and insert -- published --.

Column 3, line 45, delete "and" and insert -- any --.

Column 5, 6, Table 1, last three numbered examples 0. 1. 2. should be listed as 10. 11. 12.

Column 5, 6, Table 2, column labeled No. of ex. is missed and should appear as first column in table, each example should be consecutively numbered 13-29.

Signed and Sealed this

Twenty-first Day of April, 1998

BRUCE LEHMAN

*Attest:*

*Attesting Officer*     Commissioner of Patents and Trademarks